United States Patent Office 3,576,855
Patented Apr. 27, 1971

3,576,855
N-CHLOROFORMYL-N-PHENYLGLYCINE, INTERMEDIATE FOR PREPARING PENICILLINS
William Dvonch, Radnor, and Harvey E. Alburn, West Chester, Pa., assignors to American Home Products Corporation, New York, N.Y.
No Drawing. Original application Mar. 1, 1965, Ser. No. 436,342, now Patent No. 3,453,263, dated July 1, 1969. Divided and this application Feb. 7, 1969, Ser. No. 816,854
Int. Cl. C07c 101/44
U.S. Cl. 260—518  1 Claim

ABSTRACT OF THE DISCLOSURE

A compound, N-chloroformyl-N-phenylglycine, used as an intermediate in the preparation of penicillins.

---

This application is a division of Ser. No. 436,342, filed Mar. 1, 1965, now Pat. No. 3,453,263.

This invention relates generally to preparation of penicillins and more particularly to a novel method for preparing 6-(α-aminoacylamino)-penicillanic acids additionally substituted on the alpha carbon atom; and non-toxic salts thereof.

In U.S. Pat. 2,985,648 there are disclosed penicillanic acid derivatives having the formula:

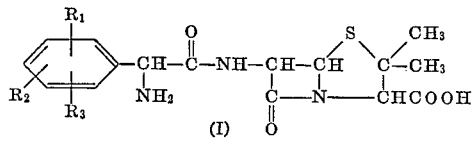

wherein $R_1$, $R_2$ and $R_3$ each represent a member selected from the group consisting of hydrogen, nitro, di(lower) alkylamino, (lower) alkanoylamino, (lower) alkanoyloxy, (lower) alkyl (including straight and branched chain saturated aliphatic groups having from 1 to 6 carbon atoms inclusive), (lower) alkoxy, sulfamyl, chloro, iodo, bromo, fluoro and trifluoromethyl; and the non-toxic carboxylic acid salts thereof, including non-toxic metallic salts such as sodium, potassium, calcium and aluminum, the ammonium salt and substituted ammonium salts, e.g., salts of such non-toxic amines as trialkylamines, including triethylamine, procaine, dibenzylamine, N-benzyl-β-phenethylamine, 1-ephenamine, N,N'-dibenzylethylenediamine, dehydroabietylamine, N,N'-bis-dehydroabietylethylenediamine, N-(lower) alkylpiperidine, e.g., N-ethylpiperidine and other amines which have been used to form salts with benzylpenicillin; and the non-toxic acid-addition salts thereof (i.e., the amine salts) including the mineral acid-addition salts such as the hydrochloride, hydrobromide, hydroiodide, sulfate, sulfamate and phosphate and the organic acid-addition salts such as the maleate, acetate, citrate, oxalate, succinate, benzoate, tartrate, fumarate, malate, mandelate, ascorbate, and the like.

As stated in U.S. Pat. 2,985,648, the compounds (I), defined above are of value as antibacterial agents, nutritional supplements in animal feed; agents for the treatment of mastitis in cattle; and as therapeutic agents in poultry and mammals, including man, in the treatment of infectious diseases caused by gram-positive and gram-negative bacteria, upon either parenteral or oral administration. Moreover, the compounds show marked resistance to destruction by acids.

The 6-(α-aminoacylamino)-penicillanic acids coming within the above Formula I may be prepared by the method disclosed in said U.S. Pat. 2,985,648. This known method generally comprises reaction of 6-aminopenicillanic acid with an alpha-amino benzylacid halide or anhydride in which the amino group has previously been provided with a protecting acyl group, such as

or some other functionally equivalent protecting group. To recover the desired alpha-amino benzyl penicillanic acid derivative, it is necessary, in said method, to remove the protecting group by catalytic hydrogenation under sufficiently mild conditions to avoid destruction of the penicillin nucleus. Thus, in accordance with this known method, it is necessary to proceed through four separate operational steps as follows: (1) the amino group of the amino acid reactant to be used has to be blocked with a protecting acyl group, (2) the anhydride has to be formed from the protected amino acid, (3) the protected anhydride has to be reacted with 6-aminopenicillanic acid, and then (4) the protecting group must be removed by catalytic hydrogenation to obtain the desired penicillanic acid derivative.

While, as already stated, it is known that the specific blocking group referred to above may be replaced by another functionally equivalent protecting group; in all instances heretofore disclosed, the subsequent removal of the protecting group by catalytic hydrogenation has been necessary to obtain the free 6-(α-aminoacylamino)-penicillanic acid derivative. Unfortunately for the efficient application of this prior art method, the penicillin molecule possesses a sulfur atom and, as is well known in the art, sulfur is a hydrogenation catalyst poison. This inherent characteristic of sulfur-containing molecules has made it extremely difficult to obtain pure 6-(α-aminoacylamino)-penicillanic acids in high yields by said method.

We have now discovered a novel process for the production of 6-(α-aminoacylamino)-penicillanic acids of the type described hereinbefore, whereby high yields of high purity product can be efficiently and economically obtained. With our invention, 6-(α-aminoacylamino)-penicillanic acids can be produced more efficiently than by said known process and without the need for initially introducing, and finally removing the group protecting the amino group, by catalytic hydrogenation.

It is a distinctive feature of our invention that the catalytic hydrogenation step which has heretofore presented so much difficulty in the preparation of 6-(α-aminoacylamino)-penicillanic acids is entirely eliminated, thus providing a more efficient, productive and economic procedure than is now known in the art. Another most important feature of the present invention is that the use of organic solvents in the reaction mixtures employed in the exercise of the method of the present invention has been found unnecessary. These economic advantages of the process we have discovered over the prior art makes it more likely that these penicillins will become commercially available at reasonable cost. Moreover, our novel method enables the facile production of additional categories of 6-(α-amino-acylamino)-penicillanic acids not contemplated in U.S.P. 2,985,648, as will appear hereinafter.

The process of our invention generally comprises the reaction of an N-chloroformyl derivative of an amino acid, as defined below, with 6-aminopenicillanic acid in an aqueous medium having a pH of from about 2.0 to 7.0.

The reaction may be represented schematically as follows:

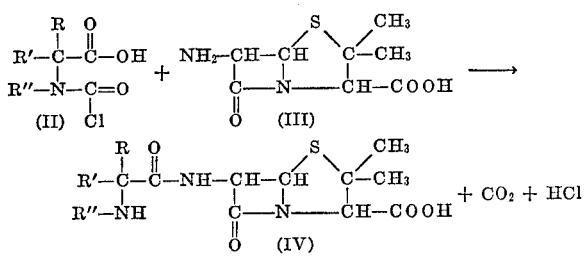

wherein R, R' and R" each may represent a member selected from the group consisting of hydrogen, aryl, aralkyl, saturated alkyl, unsaturated alkyl, cycloalkyl, and heterocyclic radicals; R and R' may be joined to form a hydrocarbon ring; and R' and R" may be joined to form a heterocyclic ring. R, R' and R", when separate radicals or forming a ring as defined, may carry substituents such as those disclosed for aryl in U.S.P. 2,985,648, and above.

The N-chloroformyl derivatives (II) of amino acids suitable for use in the method of the invention, may be prepared by what is referred to generally as a phosgenation procedure. This method has the desirable features that it does not change the steric configuration when an asymmetric carbon is present. The reaction for preparing the N-chloroformyl derivatives (II) by said phosgenation procedure generally comprises the reaction of a suitable amino acid and phosgene and may be represented schematically as follows:

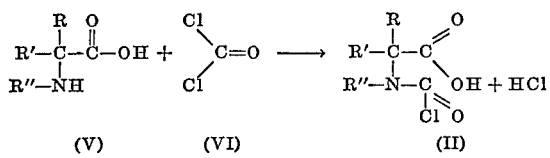

Preferably, in said phosgenation procedure, the amino acid reactant (V) is dissolved or suspended in dioxane, phosgene (VI) is introduced into the reaction mixture, the reaction is interrupted, the reaction mixture is aerated and concentrated, preferably in vacuo, to remove phosgene and hydrochloric acid, and the resulting N-chloroformyl derivative (II) is crystallized by the addition of an agent such as ethyl acetate.

Numerous methods for preparation of the 6-aminopenicillanic acid are now available in the art, including the methods referred to in said U.S.P. 2,985,648, and hence need not be described here. In this connection, in lieu of 6-aminopenicillanic acid, the salts thereof, such as the sodium or potassium salts, prepared in conventional manner from the acid, may be substituted in the reaction mixtures containing the selected N-chloroformyl derivative of an amino acid. However, due to the basicity of such salts, adjustment of the reaction mixtures containing them is required to bring them within the specified pH range, else the yields obtained therefrom are undesirably diminished.

In the preferred exercise of the method of the present invention, the N-chloroformyl derivative of an amino acid chosen, is reacted with 6-aminopenicillanic acid in approximately 2:1 molar quantities in a cold aqueous solution in the pH range from about 2.0 to about 7.0 referred to hereinbefore. The mixture is stirred for several hours at a temperature from just above the freezing point of the aqueous mixture to about 37° C., and preferably in the range 0–10° C. Alternatively, the reaction mixture may contain a substantial amount of organic solvent (e.g. dioxane, ethyl acetate) in order, in certain instances, to obtain the advantages of our inventive method with respect to yield.

The surprising nature of our discovery becomes the more evident when the unique characteristics of 6-aminopenicillanic acid is taken into account. For example, it is known that 6-aminopenicillanic acid will polymerize under certain conditions. In addition, it is well known that the lactam linkage present in its structure is a sensitive one. These properties would tend to suggest to skilled workers in the art that the reaction with an N-chloroformyl derivative of an amino acid could not proceed to any appreciable extent without decomposition, hydrolysis polymerization, side reactions, etc.

It would also be expected that, if the 6-aminopenicillanic acid were not decomposed, hydrolyzed, polymerized, or otherwise altered as referred to above, the reaction of the N-chloroformyl derivatives (II) with 6-aminopenicillanic acid would result in ureido acid compounds of the formula:

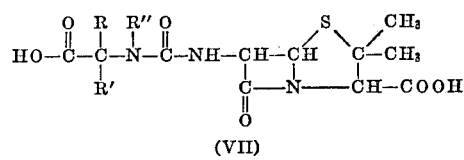

Contrariwise, however, under the controlled pH, aqueous medium conditions of our invention, high yields of relatively pure product of Formula IV are obtained.

The following examples illustrative of our invention are by no means to be considered limitative thereof.

EXAMPLE 1

Preparation of 6-(2-anilino acetamido) penicillanic acid (A) 25.4 g. N-phenylglycine were suspended in 600 ml. dioxane. The mixture was maintained at 40° C. for 2.5 hours, during which time an excess of phosgene was introduced into the mixture. The reaction was arrested at the end of 2.5 hours, at which time the mixture was aerated and then concentrated in vacuo at 25° C. to an oil. To the oil was added ethyl acetate which caused crystallization of N-chloroformyl-N-phenylglycine from the solvent mixture. The N-chloroformyl derivative was separated from the dioxane-ethyl acetate solvent system by filtration and then dried in vacuo over silica-gel.

(B) There were added 1.08 g. 6-aminopenicillanic acid (5 m. mole) to 100 ml. water and the pH of the resulting solution was adjusted to 6.0 by addition of sodium hydroxide solution. The solution was diluted to 150 ml. with water and cooled to 5° C. in an ice bath. N-chloroformyl-N-phenylglycine (10 m. mole; 2.14 g.) prepared as in (A) above was dissolved in 50 ml. dioxane. The solution was added to the solution of 6–APA with stirring. After 20 minutes, the pH was adjusted to 7.0 by additional sodium hydroxide solution and the solution was freeze-dried to give the crude salt. The salt was purified by dissolution in water, adjustment of the pH to 3.0 with phosphoric acid, extraction of the free acid with amyl acetate, and addition of potassium acetate in 90% isopropyl alcohol, to precipitate the pure potassium salt.

EXAMPLE 2

N-chloroformyl-N-phenylglycine (VIII) prepared as in Example 1 (A) and dissolved in 10 ml. dioxane was added to 6-aminopenicillanic acid (6–APA), or the sodium salt thereof (Na 6–APA), dissolved in 30 ml. of water or buffer-solvent system, as set forth in Column A of Table I below, to provide varying proportions of 6-aminopenicillanic acid (or salt) as set forth in Columns B and C of said table. Each of the mixtures was cooled to 5° C., and stirred for 20 minutes. The pH of each reaction mixture was taken (Column D) and each mixture was diluted to 100 ml., bioassayed, and the nonbuffered solutions then freeze dried to isolate the crude penicillin. The yield obtained from each run is set forth in Column E of Table I.

TABLE I

[Reaction of N-chloroformyl-N-phenylglycine (VIII) with 6-APA and Na 6-APA]

| A | B | C | D | E [2] |
|---|---|---|---|---|
| Solvent for 6-APA or Na 6-APA | 1 mm. 6-APA/ 1 mm. (VIII) | 1 mm. Na 6-APA/ 1 mm. (VIII) | Reaction, pH | Yield, percent |
| (a) 0.1 M pH 6.0 acetate buffer | 1/1 | | 4.41 | 55 |
| (b) 0.1 M pH 5.3 acetate buffer | 1/1 | | 5.06 | 59 |
| (c) water | 1/1 | | 2.57 | 17 |
| (d) water | | 1/1 | 3.73 | 41 |
| (e) 0.2 M pH 6.0 acetate buffer | | 1/1 | 5.62 | 58 |
| (f) 0.2 M pH 6.0 acetate buffer | | 1/2 | 4.23 | 75 |
| (g) 0.2 M pH 6.0 acetate buffer | | 2/2 | 4.36 | 72 |
| (h) water | | 1/1 | 3.54 | 56 |
| (i) water | | 1/2 | 2.24 | 78 |
| (j) water | | 2/2 | 3.41 | 53 |

[1] M. mole.
[2] 100% is 1 m. mole ampicillin staph activity.

EXAMPLE 3

The procedure utilized in Example 2, Table I, run (i) was repeated on a larger scale, utilizing 5 m. mole of the sodium salt of 6-aminopenicillanic acid and 10 m. mole of the N-chloroformyl-N-phenylglycine. A bioassay yield of 89% was found. One gram of the crude salt obtained by freeze-drying was purified by dissolution in 3 ml. water containing 0.5 g. ammonium sulfate, adjustment of the pH to 2.5–3.0 with 8% phosphoric acid, extraction of the free acid with two additions of 10 ml. amyl acetate, and addition of 1.6 ml. of a solution of 2 M potassium acetate in 90% isopropyl alcohol, to precipitate the purified potassium salt after storage at −10° C. The salt was washed with 90% isopropyl alcohol and dried in vacuo. Elementary analysis of the purified potassium salt gives the following results:

*Analysis.*—Calcd. for $C_{16}H_{18}N_3O_4S$ K (percent): C, 49.63; H, 4.68; N, 10.85; S, 8.28; K, 10.10. Found (percent): C, 49.16; H, 4.71; N, 10.09; S, 8.5; K, 9.84.

Bioassay of the purified potassium salt gave the following values:

Organism:      Equivalent ampicillin γ/mg.
    *Staphylococcus aureus* ———————— 825
    *Escherichia coli* ———————— 40

The 89% yield based on ampicillin found for this run was calculated on the basis of the purified salt to give a substantially quantitative yield of 97%.

EXAMPLE 4

Utilizing the procedure of Example 2, a series of runs was performed in various reaction systems and under different conditions, the employment of which and the results obtained thereby, being summarized in Table II below:

TABLE II

[Reaction of N-chloroformyl-N-phenylglycine (VIII) with Na 6-APA]

| A | B | D | E |
|---|---|---|---|
| Reaction system | 1 mm. Na 6-APA 1 mm. (VIII) | Reaction, pH | Yield, percent |
| Na 6-APA in 30 ml. water; (VIII) in 10 ml. dioxane; 20 minutes at 5° C | $1/2 = \frac{0.025M}{0.050M}$ | 6.0→2.2 | 97 |
| Na 6-APA in 40 ml. water; (VIII) added dry; 2 hours at 5° C | $1/20 = \frac{.025M}{0.050M}$ | [2] 6.0→3.7 | 96 |
| Na 6-APA in 5 ml. ethyl acetate; (VIII) in 5 ml. ethyl acetate; shaken 5 min. at −10° C | $1/1 = \frac{0.1M}{0.1M}$ | | 34 |
| Same as above; 25° C | | | 38 |

[1] M. mole.
[2] After 20 min.; maintained at 7.0 for rest of time.

EXAMPLE 5

Following the procedure of Example 1, the corresponding 6-(α-aminoacylamino) penicillanic acid is prepared by the reaction of 6-amino-penicillanic acid with N-chloroformyl derivative (II) prepared by interrupted phosgenation (as described in Example 1 (A)) of the following:

Glycine
α-Phenylglycine
Alanine
C-allylglycine
α-Aminoisobutyric acid
β-Methylaspartic acid
S-benzylcysteine
gamma-Ethylglutamate
P-acetylhydroxyproline
O-tosylhydroxyproline
Isoleucine
Leucine
2,5-diacetoxyphenylalanine
3,4-diacetoxyphenylalanine
epsilon-Tosyllysine
Methionine
Norleucine
p-Nitrophenylalanine
Proline
O-acetylserine
O-benzylserine
O-acetyltyrosine
Valine
1-benzylhistidine
Tryptophan
1-aminocyclopentane-carboxylic acid
1-aminocyclohexane-carboxylic acid
1-aminocycloheptane-carboxylic acid For all of the amino acids listed, with the exceptions of glycine, α-aminoisobutyric acid, and the last three, the D-, L- or DL- forms can be prepared.

What is claimed is:
1. N-chloroformyl-N-phenylglycine.

References Cited

UNITED STATES PATENTS 3,194,802 7/1965 Alburn et al. 260—239.1
3,213,083 10/1965 Alburn et al. 260—239.1
3,248,387 4/1966 Alburn et al. 260—239.1

CHARLES B, PARKER, Primary Examiner

J. L. DAVISON, Assistant Examiner

U.S. Cl. X.R.

260—239.1

PO-1050
(5/69)

UNITED STATES PATENT OFFICE
CERTIFICATE OF CORRECTION

Patent No. 3,576,855              Dated   April 27, 1971

Inventor(s)   William Dvonch and Harvey E. Alburn

It is certified that error appears in the above-identified patent and that said Letters Patent are hereby corrected as shown below:

Column 4, line 63, "(VIII)" should read -- (II) --.

Column 5, line 2, "(VIII)" should read -- (II) --.

Column 5, line 5, under the sub-heading "Solvent for 6-APA or Na6-APA", Column B, "(VIII)" should read -- (II) --.

Column 6, line 27, "(VIII)" should read -- (II) --.

Column 6, line 30, under the sub-heading "A reaction system", Column B, "(VIII)" should read -- (II) --.

Signed and sealed this 30th day of May 1972.

(SEAL)
Attest:

EDWARD M. FLETCHER, JR.
Attesting Officer

ROBERT GOTTSCHALK
Commissioner of Patents